United States Patent Office 3,238,097
Patented Mar. 1, 1966

3,238,097
CONTROL OF VERMINOUS ANIMALS
Andrew J. Reinert and Jennings P. Blackwell, Bartlesville, Okla., assignors to Phillips Petroleum Company, a corporation of Delaware
No Drawing. Filed May 7, 1963, Ser. No. 278,747
18 Claims. (Cl. 167—46)

This invention relates to the eradication and/or control of verminous warm-blooded animals. In one of its aspects, the invention relates to a method for reducing the number of verminous warm-blooded animals in an area or locality. In another aspect, this invention relates to animal eradication and control compositions.

The control of noxious animals is a problem which is currently troubling both urban and rural areas. This is especially true with regard to the control of birds and rodents since both types of animals consume large quantities of grain each year, and both are carriers of many diseases, some of which are very dangerous to the human population. Moreover, many cities are concerned with the problem of roosting birds, particularly starlings. The total expenditure in cleaning buildings, roofs, window ledges, and the like, due to the bird population, is many thousands of dollars each year, while the loss of grain, fruit, etc., to feeding birds and rodents runs into millions of dollars each year. The problem of attack upon growing trees, nursery stock, and other materials, as well as certain plants, by rodents has become serious in many localities. In many instances, the problem is also very serious in buildings and warehouses which are used for storage of various products, particularly grain.

The control of rodents, for example, rats and mice, has been approached primarily through the use of agents that kill these animals. On the other hand, the control of birds has been approached through the use of scarecrows, noise makers, repellents and poisons. Birds have also been controlled by the use of chemicals which cause convulsions, warning cries, etc., following ingestion of a small amount of these chemicals. These convulsions and warning cries serve to drive other birds away from the area where the control composition was set out.

One problem which has been encountered with bird management and rodent control chemicals is that they are not sufficiently rapid in their action. Thus, for example, a bird ingesting food containing a bird management chemical may leave the immediate area before undergoing convulsions and emitting cries and the desired effect on other birds in the treating area is thereby lost. Furthermore, if the bird has ingested sufficient chemical to cause death, the bird may die a considerable distance away from the treating area. While it has been shown that these agents are not secondary poisons, that is, animals eating the dead animals will not be affected, the sight of dead animals such as birds in certain localities has offended many people, particularly bird lovers, and has been the subject of considerable controversy.

This invention relates to novel animal control compositions and to a method for eradicating and/or controlling the activity of noxious animals by subjecting same to the action of certain cycloalkanesulfonyl fluorides.

Accordingly, an object of this invention is to provide novel animal eradication and/or control compositions.

Another object of this invention is to provide an effective method for reducing the number of animals frequenting an area.

A further object of this invention is to provide control chemicals which are very rapid in their action and thus prevent affected animals from leaving the immediate treating area.

A further object of this invention is to provide novel compositions and methods for protecting property from noxious animals.

Other aspects, objects and the several advantages of the invention will be apparent from a study of the disclosure and the appended claims.

According to the present invention, it has been found that the activity of verminous warm-blooded animals, especially verminous mammals and birds, can be effectively controlled by subjecting same to the action of at least one cycloalkanesulfonyl fluoride compound having the structural formula

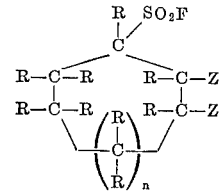

wherein $n$ is an integer selected from the group consisting of 0 and 1, Z is selected from the group consisting of R and $SO_2F$, each R is selected from the group consisting of hydrogen, methyl and ethyl radicals, and the maximum number of $SO_2F$ groups in said compound is two.

Representative and specific cycloalkanesulfonyl fluoride compounds of the above-described general structural formula that can be employed according to the practice of the invention include:

trans-cyclopentane-1,3-di(sulfonyl fluoride),
trans-cyclohexane-1,3-di(sulfonyl fluoride),
2,6-dimethyl-trans-cyclohexane-1,3-di(sulfonyl fluoride),
2-ethyl-trans-cyclopentane-1,3-di(sulfonyl fluoride),
1,3-dimethyl-trans-cyclopentane-1,3-di(sulfonyl fluoride),
1-methyl-5-ethyl-trans-cyclopentane-1,3-di(sulfonyl fluoride),
1,2,2,3,4,4,5,5,6,6-decaethyl-trans-cyclohexane-1,3-di(sulfonyl fluoride),
trans-cyclohexane-1,3-di(sulfonyl fluoride),
cyclopentanemonosulfonyl fluoride,
cyclohexanemonosulfonyl fluoride,
trans-cyclopentane-1,2-di(sulfonyl fluoride),
trans-cyclohexane-1,2-di(sulfonyl fluoride), and the like. While the above-enumerated di(sulfonyl fluoride) compounds are all of the preferred form, the trans isomer, it is to be understood that both the cis and trans isomers and mixtures of the two can be employed, if desired.

Many of the compounds of the invention can be purchased from commercial sources, but not all are available. Synthesis of these compounds can be effected by conventional techniques. One suitable method for preparing cyclopentane-1,3-di(sulfonyl fluoride), for example, comprises sulfochlorinating a hydrocarbon such as cyclopentane to trans-cyclopentane-1,3-di(sulfonyl chloride) and then reacting this compound with KF to form trans-cyclopentane-1,3-di(sulfonyl fluoride). However, as indicated above, it is within the scope of the invention to utilize one or more of the above-defined cycloalkanesulfonyl fluorides prepared by any known procedure.

It has been found according to the invention that verminous or noxious warm-blooded animals, especially verminous mammals and birds, can be eradicated and/or controlled effectively by causing at least one of the species to ingest a small amount of at least one of the above-defined cycloalkanesulfonyl fluorides, perfereably in combination with an animal food. Animals that can be eradicated and/or controlled according to the invention include, inter alia, rats, mice, weasels, coyotes, skunks, prairie dogs, wolves, rabbits, birds, and the like.

It has been found that the various sulfonyl fluoride compounds disclosed above are very effective "bird management" agents. Birds that have eaten even a very small amount of these "bird management" agents are unable to fly for some time, and during this period of time (inability to fly), the birds undergo convulsions, emit warning or distress cries to other birds, etc. It is not known definitely by what mechanism these warning cries or convulsive actions serve to drive other birds away from affected birds but, as shown by the specific examples hereinbelow, the compounds of the invention are extremely effective for reducing the number of birds in an area after at least one of the birds has been subjected to the action of one of the compounds of the invention, e.g., ingestion of a bird food treated with one of the defined cycloalkanesulfonyl fluorides.

Ingestion of a sufficient amount of at least one of the sulfonyl fluoride compounds of the invention defined above by one or more birds, for example, produces symptoms such as tremors, loss of flight, fluttering, paralysis, and warning and distress calls or cries. The result is that other birds upon seeing birds having convulsions or suffering from paralysis, and hearing the distress cries emitted by affected birds, even entire flocks of birds will leave a treating area and stay away from the area for long periods of time. The agents of this invention are also lethal to animals, especially verminous mammals and birds, but in addition to being eradicants, they cause affected birds to undergo convulsions and to emit warning cries.

The outstanding characteristic of the compounds of the invention is their extreme rapidity of action. For example, birds ingesting a very small amount of one or more of the compounds of the above formula begin to undergo convulsions and emit warning cries, usually in less than one minute and often less than 30 seconds. Furthermore, the potency of these agents is such that the birds, for example, are unable to leave the area and even though many of the birds ingesting the compound are killed by the chemical, one is not troubled with the problem of dead birds being found outside of the immediate treating area. The amount of cycloalkanesulfonyl fluoride compound ingested by an animal required to cause death will vary depending upon the particular compound employed, the species of animal, as well as other factors. For example, in most species of birds and rodents, the median lethal dose ($LD_{50}$) is less than 8 mg./kg. (milligrams of chemical per kilogram of animal weight). Thus, it can be seen that the compounds of the invention are quite potent.

When employing the control compositions of the invention to reduce the number of animals in an area, one or more of the animals in the area to be cleared (treating area) must ingest an effective amount of at least one of the compounds in order to achieve the best results. The active cycloalkanesulfonyl fluoride compounds can be ingested by the animals by feeding same treated food, or by injecting a small amount of at least one of the compounds into at least one of the animals stomachs by suitable means and placing the treated animal in an area from which other animals are to be driven or eradicated. The amount of effective compound ingested by an animal to get the desired effect is generally in the range of ½ to 500 milligrams (mg.) of the active ingredient per kilogram (kg.) of animal weight, usually in the range of 1 to 100 milligrams (mg.) per kilogram (kg.) of animal weight.

The compounds of the invention can be conveniently given to birds, for example, by treating a food normally eaten by the birds and thereafter placing the treated food or bait in the area in which it is desired to reduce the number of birds. Typical food stuffs for birds and rodents, for example, that can be treated with the agents of the invention include grains and seeds such as sorghum, corn kernels, popcorn, chicken feed, kaffir corn, wheat, oats, barley, and the like, as well as other food stuffs such as potatoes, bread, fruit, nuts, and the like. In addition to the above-described foods, the active compounds of the invention can be incorporated in any animal food, as well as containers and other attractants such as paper or cloth bags used for storing materials. If a grain is used, a convenient method for treating the grain comprises impregnating same with a solution of one of the agents and a volatile solvent and thereafter evaporating off the volatile solvent. An acetone-water mixture is a convenient medium for use in such a method of operation. If, however, bread, potatoes, fruit, and the like are used as bait or food, inverted emulsions or other oily materials are suitable methods for applying the active compounds of the invention to the food or bait material.

The compounds of the present invention can be applied to animal food or other materials for their intended purpose as a solid, a concentrate or in combination with a liquid carrier or other inert materials. Solvent or adjuvant carriers employed should be substantially inert with respect to the active sulfonyl fluoride compound. Some examples of specific materials that can be employed include water, acetone, water-acetone mixtures, ethers, toluene, benzene, methyl alcohol, ethyl alcohol, and the like. It is also within the scope of the invention to employ mixtures of the cycloalkanesulfonyl fluoride compounds of the invention and to employ mixtures of one or more of these compounds with other known animal control agents.

Whatever method is employed for treating the animal food or other material, the treated material will generally contain from 0.01 to about 10 percent by weight of the active control agent, based on the treated food or material, preferably 0.02 to about 5 weight percent. The lower percentages will, of course, be used when the more active agents are to be employed, while the high percentages will be used when the less effective agents are used. Larger or smaller amounts, however, can be employed when desired although larger amounts are generally uneconomical.

In actual operation, noxious animals such as rats can can be effectively poisoned with a very minor amount of one of the above-described compounds. Bird control can be effected by employing small amounts of treated bird food, for example, and one need not treat the entire area such as would be required by many other procedures. By operating in this manner, buildings, airport runways, grain fields, etc., can be cleared of birds and maintained clear of birds for prolonged periods of time. This is particularly advantageous in grain fields since farmers can place small amounts of treated grain in the field shortly before the grain ripens, thus reducing the number of birds in the fields before they have a chance to eat the crop. After the crop has been harvested, the use of treated bait, food or other material, can be discontinued. In many instances, it is desirable to first lure birds into the treating area with a bait or untreated food, and then place treated food in the area for the birds to consume with the result that affected birds warn and scare other birds away from that particular area.

The following specific examples clearly demonstrate the effectiveness of the control agents of the invention against birds and rodents, in particular. It is not intended, however, that the invention be limited to the features of the specific examples in view of the foregoing disclosure.

EXAMPLE I

A series of runs was carried out in which trans-cyclopentane-1,3-di(sulfonyl fluoride) was tested as a control agent for birds and rodents.

The trans-cyclopentane-1,3-di(sulfonyl fluoride) was synthesized by charging 261 grams of cyclopentane to a 500 ml. reaction flask and then bubbling 300 grams of $SO_2$ and 200 grams of $Cl_2$ into the cyclopentane over a 7-hour period while irradiating the flask with a 100-watt ultraviolet light which was shining through a Pyrex glass sleeve. The light used had a wave length of approximately 2500–5000 A. (Angstroms). During the reaction, the temperature was maintained at 100° F. by the use of ice water circulated in a cooling coil. The reaction mixture was distilled, and the residue remaining from the distillation was extracted with ether. After stripping off the ether, the residue from the extraction was dissolved in a solution of 1 part CCl$_4$: 2 parts ether and on cooling, a solid crystallized from the solution. The melting range of this solid was 60–65° C. This material, trans-cyclopentane-1,3-di(sulfonyl chloride) was then reacted with KF to form the corresponding fluoride. The resulting trans-cyclopentane-1,3-di(sulfonyl fluoride) had a melting point of 61–62° C. (141.8–143.6° F.).

The above-prepared trans-cyclopentane-1,3-di(sulfonyl fluoride) was dissolved in an acetone-water mixture, and small amounts of the solution were syringed into the stomachs of birds and rodents by means of tuberculin syringes. In the case of the birds, convulsions and warning cries occurred in less than one minute. In the case of rats, the rats died very quickly after injection of the active agent. The measured lethal dosages for these runs are expressed below in the form of a table.

*Table I*

Animal: Lethal dose, mg./kg.
- Rats ———————————————————— 6
- Sparrows —————————————————— 1
- Cow birds ————————————————— 5
- Starlings ——————————————————— 1

[1] One starling survived a dose of 5 mg./kg. by regurgitation, but experienced convulsions and emitted very loud warning cries.

Cyclohexane-1,4-di(sulfonyl fluoride) was also tested against birds and rats but was not lethal except at very high doses, and did not cause the birds to undergo convulsions or to emit warning cries.

EXAMPLE II

A series of runs was carried out in which a variety of cycloalkane-sulfonyl fluoride and chloride compounds were tested as bird management compositions.

In these runs, the chemicals to be tested were given orally, by means of a syringe and stomach tube, to chicks 10 to 15 days old. The effect on the chick in each case was noted, and sufficient runs were carried out to determine the LD$_{50}$ for each chemical. LD$_{50}$ is the dose required in milligrams of chemical per kilogram (kg.) of animal weight to kill 50 percent of the chicks. Although LD$_{50}$ is not a true measure of the value of the chemical as a bird control agent, all of the bird management or control agents which we have found have high toxicity for birds. Thus, when a chemical is noted to produce convulsions, cause distress cries, prevent flying, etc., the LD$_{50}$ provides a good measure of effectiveness when comparing the agent to another compound for producing these effects.

The results of these tests are expressed below as Table II.

*Table II*

| Compound | Lethal Dose For Chicks,[1] mg./kg. | Observed Results |
|---|---|---|
| Cyclopentane-1,3-di(sulfonyl fluoride). | 5 | Immediate reaction, cries, convulsions, rapid death. |
| Cyclohexane-1,3-di(sulfonyl fluoride). | ≅300 | Convulsions, rapid death (at dose tested). |
| Cyclopentanesulfonyl fluoride. | ≅60 | Convulsions, warning cries, rapid death. |
| Cyclohexanesulfonyl fluoride. | 20<x<25 | Do. |

COMPARATIVE RUNS

| | | |
|---|---|---|
| Cyclohexane-1,4-di(sulfonyl fluoride). | >1,000 | No cries, no convulsions at dose tested. |
| Cyclopentane-1,3-di(sulfonyl chloride). | Recovered at 1,000. | No convulsions or cries. |
| Cyclopentanesulfonyl chloride-3-sulfonyl fluoride. | 700 | Slow immobilization and death. |
| Ethanesulfonyl fluoride. | 7<x<10 | Very toxic, but slow and no convulsions. |
| Methanesulfonyl fluoride. | 7<x<10 | Do. |

[1] 1,000 mg./kg. highest dose tested.

The above data clearly demonstrate the superiority of the 1,3-di(sulfonyl fluorides) over the 1,4- compounds. Furthermore, while cyclopentane-1,3-di(sulfonyl fluoride) is extremely effective and toxic, cyclopentane-1,3-di(sulfonyl chloride) and cyclopentanesulfonyl chloride-3-sulfonyl fluoride were ineffective. The control runs with regard to ethanesulfonyl fluoride and methanesulfonyl fluoride demonstrate that these compounds are toxic but slow reacting and do not product the desired convulsions and cries.

EXAMPLE III

To determine possible secondary poisoning effects of cyclopentane-1,3-di(sulfonyl fluoride), a group of sparrows were each given about 1 mg. of the compound by injecting an acetone-water solution of the compound into the birds' stomach with a tuberculin syringe. The amount is about 40 times the LD$_{50}$ for sparrows (assuming average sparrow weight of 25 grams). A cat was fed 24 of the dead birds over a 3 day period and no apparent ill effects on the cat were noted.

EXAMPLE IV

A series of cage tests were carried out in which either ringbill or herring gulls were force fed trans-cyclopentane-1,3-di(sulfonyl fluoride). The gulls were force fed either capsules or bread containing varying amounts of trans-cyclopentane-1,3-di(sulfonyl fluoride). The capsule or piece of bread was dropped into the mouth of the gull and then forced down the gull's throat by a glass rod. This was not difficult for the gulls mouth and throat are several times the size of the piece of bread or capsule. The gull was then placed in a separate cage for observation. Never were there more than four gulls in one observation cage at a time. The effects of the chemical on the birds were observed and these results are expressed below in table form.

*Table III*

| Gull Type | Dosage Used | Effects |
|---|---|---|
| Juvenile herring (wt. 880 gms.). | 2 mg./kg. (40 percent water, 60 percent acetone in 3 capsules). | Gull reacted in 30 seconds, violent convulsions, loud cries, much flopping of wings, recovered in 24 hours. |
| Adult ringbill (wt. 454 grams). | 2 mg./kg. (40 percent water, 60 percent acetone in 2 capsules). | Immediate reaction, violent convulsions, flopping, distress calls, recovered in 24 hours. |
| Herring (2nd yr.) (wt. 950 grams). | 3 mg./kg. (chemical dissolved in acetone and then put in capsule). | Violent convulsions lasting 20 minutes; death. |
| Juvenile herring (wt. 823 grams). | 1 mg./kg. (chemical dissolved in acetone and then put in capsule). | Nervous, few cries, recovered. |
| Do | 2 mg./kg. (40–60 water acetone mixture in a capsule). | Convulsions, distress cries, staggering, death. |
| Juvenile herring (wt. 908 grams). | 2 mg./kg. (ethyl alcohol in a capsule). | Violent convulsions in less than a minute, death. |
| Do | 2 mg./kg. (acetone in a capsule). | Immediate inability to stand; flopping, convulsions, distress calls, etc., death. |

EXAMPLE V

Grain, including corn, sorghum and oats, is impregnated with a water-acetone mixture of trans-cyclopentane-1,3-di(sulfonyl fluoride) in an amount sufficient to provide 0.5 percent by weight of the disulfonyl fluoride based on the grain. This grain is then distributed in an area, frequented by feeding pigeons, starlings, sparrows, cow birds and grackles. Birds ingesting the treated grain are soon affected with convulsions and warning cries. These effects serve to drive the other birds from the area.

As will be evident to those skilled in the art, many variations and modifications of this invention can be practiced in view of the foregoing disclosure. Such variations and modifications are believed to come within the spirit and scope of the invention.

We claim:

1. A method for reducing the number of live verminous warm-blooded animals in an area which comprises subjecting such animals to the action of an effective amount of a cycloalkanesulfonyl fluoride compound having the structural formula

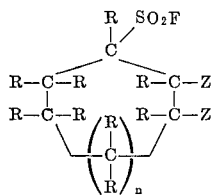

wherein $n$ is an integer from 0 to 1, Z is selected from the group consisting of R and $SO_2F$, each R is selected from the group consisting of hydrogen, methyl and ethyl, and the maximum number of $SO_2F$ groups in said compound is two.

2. A method for reducing the number of verminous warm-blooded animals in an area which comprises making available to said animals within said area animal food treated with from 0.01 to 10 weight percent of a cycloalkanesulfonyl fluoride compound having the structural formula

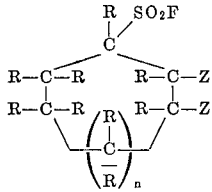

wherein $n$ is an integer from 0 to 1, Z is selected from the group consisting of R and $SO_2F$, each R is selected from the group consisting of hydrogen, methyl and ethyl, and the maximum number of $SO_2F$ groups in said compound is two.

3. A method for reducing the number of birds in an area which comprises causing at least one of said birds to ingest a cycloalkanesulfonyl fluoride compound having the structural formula

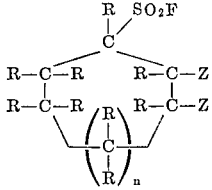

wherein $n$ is an integer from 0 to 1, Z is selected from the group consisting of R and $SO_2F$, each R is selected from the group consisting of hydrogen, methyl and ethyl, and the maximum number of $SO_2F$ groups in said compound is two, in an amount ranging up to about 500 milligrams per kilogram of bird weight sufficient to produce tremors, loss of flight, fluttering, convulsions, and distress and warning cries.

4. A method for reducing the number of live verminous warm-blooded animals in an area which comprises placing treated animal food containing from 0.02 to 5 weight percent of a cycloalkanesulfonyl fluoride compound having the structural formula

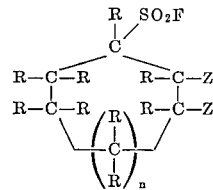

wherein $n$ is an integer from 0 to 1, Z is selected from the group consisting of R and $SO_2F$, each R is selected from the group consisting of hydrogen, methyl and ethyl, and the maximum number of $SO_2F$ groups in said compound is two in said area to reduce the number of said animals frequenting said area.

5. A method according to claim 4 wherein said animals are first attracted into the treating area with a bait.

6. An animal management composition for verminous warm-blooded animals comprising animal food containing from 0.01 to 10 percent by weight, based on said food, of a cycloalkanesulfonyl fluoride compound having the structural formula

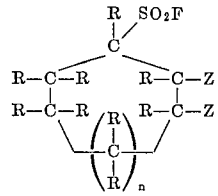

wherein $n$ is an integer from 0 to 1, Z is selected from the group consisting of R and $SO_2F$, each R is selected from the group consisting of hydrogen, methyl and ethyl, and the maximum number of $SO_2F$ groups in said compound is two.

7. A composition according to claim 6 wherein said compound is trans-cyclopentane-1,3-di(sulfonyl fluoride).

8. A composition according to claim 6 wherein said compound is cyclopentanemonosulfonyl fluoride.

9. A composition according to claim 6 wherein said compound is cyclohexanemonosulfonyl fluoride.

10. A composition according to claim 6 wherein said compound is trans-cyclohexane-1,3-di(sulfonyl fluoride).

11. An animal management composition for verminous warm-blooded animals comprising (a) a cycloalkanesulfonyl fluoride compound having the structural formula

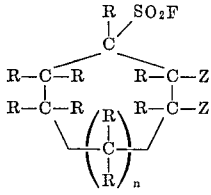

wherein $n$ is an integer from 0 to 1, Z is selected from the group consisting of R and $SO_2F$, each R is selected from the group consisting of hydrogen, methyl and ethyl, and the maximum number of $SO_2F$ groups in said compound is two, and (b) a solid material that will carry said fluoride compound into an animal's system, the amount of (a) ranging from 0.01 to 10 percent by weight, based on (b).

12. A composition according to claim 11 wherein said compound is trans-cyclopentane-1,3-di(sulfonyl fluoride).

13. A composition according to claim 11 wherein said compound is cyclopentanemonosulfonyl fluoride.

14. A composition according to claim 11 wherein said compound is cyclohexanemonosulfonyl fluoride.

15. A composition according to claim 11 wherein said compound is trans-cyclohexane-1,3-di(sulfonyl fluoride).

16. A method for reducing the number of live verminous warm-blooded animals in an area which comprises making available to said animals within said area (a) a cycloalkanesulfonyl fluoride compound having the structural formula

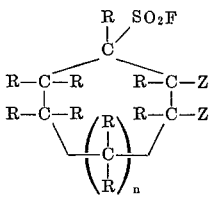

wherein $n$ is an integer from 0 to 1, Z is selected from the group consisting of R and $SO_2F$, each R is selected from the group consisting of hydrogen, methyl and ethyl, and the maximum number of $SO_2F$ groups in said compound is two, and (b) a material treated with from 0.01 to 10 weight percent of said cycloalkanesulfonyl fluoride compound, said material being capable of carrying said compound into an animal's system.

17. A bird management composition comprising grain containing from 0.01 to 10 percent by weight, based on grain, of a cycloalkanesulfonyl fluoride compound having the structural formula

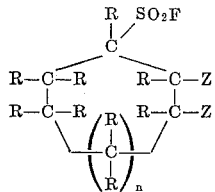

wherein $n$ is an integer from 0 to 1, Z is selected from the group consisting of R and $SO_2F$, each R is selected from the group consisting of hydrogen, methyl and ethyl, and the maximum number of $SO_2F$ groups in said compound is two.

18. A bird management composition comprising grain containing from 0.01 to 10 percent by weight, based on grain, trans-cyclopentane-1,3-di(sulfonyl fluoride).

References Cited by the Examiner
UNITED STATES PATENTS

| | | | |
|---|---|---|---|
| 2,174,506 | 9/1939 | Fox | 260—543 |
| 2,174,509 | 9/1939 | Fox | 260—543 |
| 2,276,097 | 3/1942 | Salzberg | 260—543 |
| 2,420,568 | 5/1947 | Sennewald | 167—48 |
| 2,994,636 | 8/1961 | Davis | 167—48 |

JULIAN S. LEVITT, *Primary Examiner.*